United States Patent [19]
Gregoire

[11] 3,722,103
[45] Mar. 27, 1973

[54] ADJUSTABLE ANTHROPOMETER

[75] Inventor: Harvey G. Gregoire, Patuxent River, Md.

[73] Assignee: The United States of America as represented by the Secretary of the Navy

[22] Filed: Feb. 1, 1970

[21] Appl. No.: 111,384

[52] U.S. Cl. ............................33/174 D, 73/432 SD
[51] Int. Cl. .................................................A61b 5/10
[58] Field of Search.............33/174 D, 8; 73/432 SD

[56] References Cited

UNITED STATES PATENTS 3,196,551  7/1965  Provost...............................33/174 D
865,350  9/1907  Berenberg.........................33/174 D

*Primary Examiner*—Leonard Forman
*Assistant Examiner*—Richard R. Stearns
*Attorney*—R. S. Sciascia and Thomas O. Watson, Jr.

[57] ABSTRACT

An anthropometric device designed to provide accurate measurements for evaluation of crew station design. The device can be adjusted to simulate various anthropometric dimensions. Modified retractable tape measures provide arm reach and leg reach distances. A head assembly includes a 180° compass and a retractable reference line to provide angle of vision measurements in elevation and azimuth. The device also includes hip, back and shoulder assemblies which can be adjusted to any percentile rank dimension specified or any population.

5 Claims, 2 Drawing Figures

PATENTED MAR 27 1973

3,722,103

INVENTOR.
HARVEY G. GREGOIRE
BY *Thomas O. Watson Jr.*

ATTORNEY

ADJUSTABLE ANTHROPOMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to devices for providing accurate anthropometric data for evaluation of crew station design. The data obtained can be used to provide work stations to accommodate the physical size range of a particular user population.

Prior art methods of quantifying reach distances and other anthropometric measurements were crude at best. Two or three dimensional mannequins have been used to check "fit" of personnel in various operator work stations. The three dimensional mannequins are limited to one particular size each with no adjustments. The two dimensional mannequins are limited in adjustments and some have no adjustments. The two dimensional mannequins are also not capable of any "reach" measurements related to body width or breath. All mannequins are extremely heavy, clumsy, and difficult to use.

One of the primary methods used to quantify reach distances is to take many anthropometric dimensions of many people in order to identify certain individuals as potential (e.g. fifth, 50th or 95th percentile) "model" individuals in all pertinent dimensions for particular population such as auto-drivers, aviators, tank operators, submariners, etc. There are several serious disadvantages in attempting to use live subjects. It is nearly impossible to find individuals with a specific percentile rank of anthropometric dimensions in all dimensions. For example if an individual with a 50th percentile sitting shoulder height is found, the likelihood of his arm length, shoulder breath, sitting eye height etc., being 50th percentile is extremely remote. Furthermore the values obtained from using model individuals to design or evaluate such things as reachability of controls, visibility or instruments, exterior vision etc., is extremely subject to human error because of bending, stretching, etc. The mere gathering of such "model" individuals when they are needed is also an extremely difficult and sometimes expensive task.

Prior art devices are available which measure various morphological features of the human body to provide anthropometric data for later use in work station design. However, no known device exists which can be placed in position at a work station and adjusted to simulate perfect anthropometric dimensions such as sitting shoulder height, sitting eye height, eye depth, shoulder breath, arm and leg reach.

SUMMARY OF THE INVENTION

The anthropometer is a skeleton-like device which can be adjusted to simulate perfect anthropometric dimensions. The device is a composite of hip, back, shoulder, and head assemblies which can be adjusted to various anthropometric dimensions. The arm and leg reach assemblies are modified retractable tape measures which give a direct readout of reach distances. The head assembly is an adjustable unit which features a 180° compass and a retractable reference line which is positioned at the adjustable eye reference point. The compass rotates to provide angle of vision measurements in elevation and azimuth. The head assembly can also serve as a camera mount to take photos from exact eye reference positions. The assemblies can be adjusted vertically and horizontally to represent any percentile rank dimensions specified for any particular user population.

OBJECTS OF THE INVENTION

One object of this invention is to provide a device which can simulate perfect anthropometric dimensions.

Another object of this invention is to provide an adjustable anthropometer which is far easier and less expensive to use then the methods described above.

Yet another object of this invention is to provide an adjustable anthropometer with which very accurate, objective and easy measurements can be taken in a short time with a single unitary device.

Other objects, advantages and novel features of the invention will become apparent from the following detailed description of the invention when considered in conjunction with the accompanying drawings.

DETAILED DESCRIPTION OF THE PREFERRED EMBODIMENT

The adjustable anthropometer is a skeleton-like device constructed of square aluminum stock or any other suitable similar material. The device is a composite of back, hip, shoulder and head assemblies which can be adjusted to various anthropometric dimensions. The reference points are adjustable relative to the same vertical and horizontal planes that are the source of anthropometric data.

Figure 1:
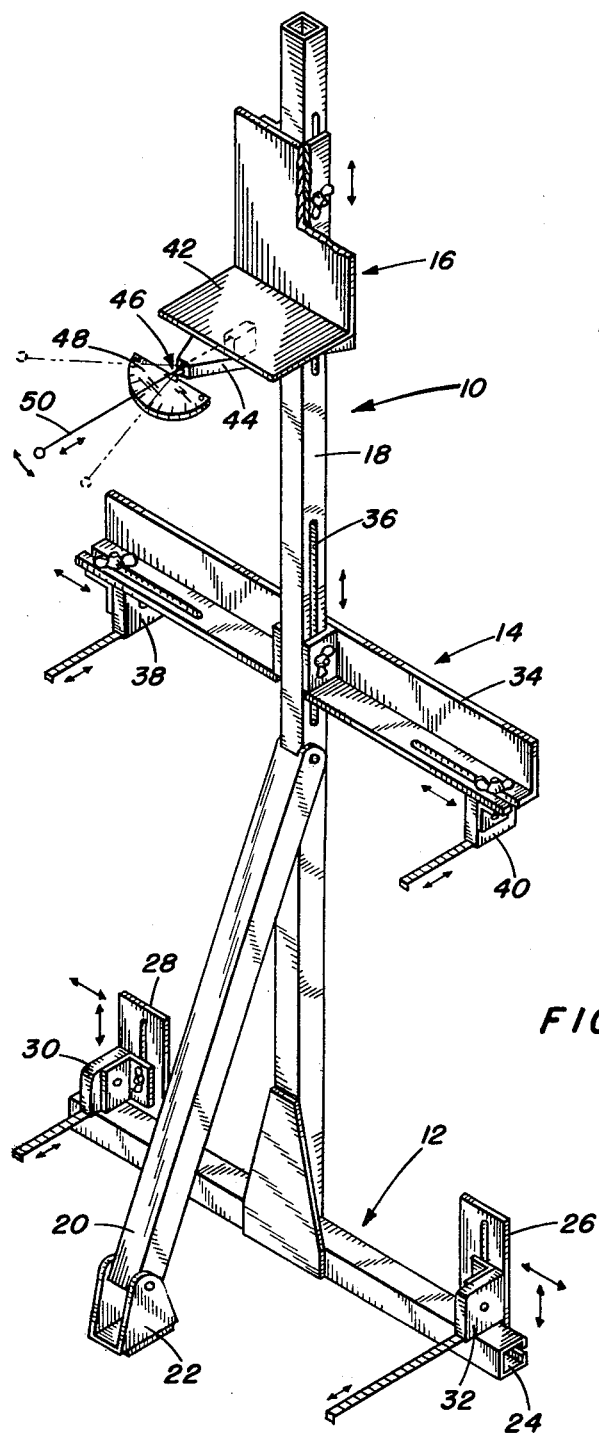
FIG. 1 is a perspective view of the adjustable anthropometer.
Figure 2:
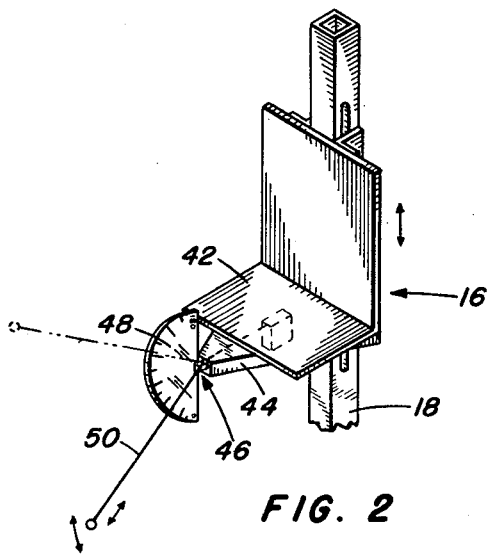
FIG. 2 is a partial top view showing the compass rotated to a horizontal position to measure azimuth.

Referring now to FIG. 1 numbers 10, 12, 14 and 16 represent the back, hip, shoulder and head assemblies respectively. The lengths of the various members as well as the adjustments are suitably chosen to represent a wide variety of anthropometric measurements from the smallest to the largest desired. Back assembly 10 consists of vertical bar 18 supported by angled bar 20 and pod 22. The hip assembly 12 consists of bar 24 attached to the bottom end of bar 18 with horizontally adjustable plates 26 and 28 attached to bar 24. Retractable tape measures 30 and 32 are attached to slots in plates 26 and 28 for vertical adjustments. The shoulder assembly 14 consists of a bar 34 mounted in a slot 36 in bar 18 for vertical adjustment. Retractable tape measures 38 and 40 are supported in slots in bar 34 for horizontal shoulder width adjustments. The head assembly 16 consists of a platform 42 adjustably mounted in a slot in bar 18. A tapered box like member 42 is attached beneath the horizontal portion of platform 42 and has a small slot 46 through which a retractable line 50 can be extended. A 180° compass 48 is pivotally mounted adjacent the retractable line 50 so that it can be rotated to measure line of sight in azimuth and elevation. FIG. 2 shows the compass 48 rotated to a horizontal position with 50 extended to measure the angle of vision in azimuth.

In operation the anthropometer is placed in position at the crew station and the assemblies can be adjusted to represent any percentile rank dimension specified for any user population. Once the specified overall dimension has been adjusted (which takes about 3 minutes) the arm or leg retractable tapes are extended to the particular hand or foot control to be operated. The distance is read directly from the tape. The distance can then be compared to existing tables of anthropometric data and an accurate quantification can then be made concerning what percent of the population can or cannot reach a particular control. More importantly, in the design phase of a crew station the control can be relocated or reoriented so that it is within reach of the user population. Use of the device during design phases of prototype equipment can assure that all hand and foot operated controls are within the proper distances to accommodate the physical size range of the particular user population.

The head assembly can be adjusted to any sitting eye height dimension. The retractable line 50 is then stretched to the instrument or item being measured. The adjustable compass 48 is then oriented to quantify the angle of vision from a particular eye height. Angle of vision measurements can be used to quantify man to machine incompatibilities relative to exterior vision criterion and vision obstruction.

Thus there has been disclosed a device which can easily and quickly simulate perfect anthropometric dimensions and provide accurate quantification for use in evaluating crew station design. Obviously many modifications and variations of the present invention are possible in light of the above teachings. For example, alternative construction could take the form of various metals or slight variations in dimensions of the subassemblies (i.e. tubular construction etc.).

What is claimed is:

1. An apparatus for evaluating crew station design comprising:
   frame means vertically oriented relative to a reference surface for simulating the upper portion of a person's body in a sitting position;
   head position simulating means vertically adjustably mounted on said frame adjacent the upper end of said frame means and including means for measuring an angle relative to the vertical or horizontal line of vision therefrom;
   shoulder simulating means vertically adjustably mounted on said frame and including arm location simulating means horizontally adjustably mounted at each end thereof said arm location simulating means including arm reach simulating means having extensible measuring means thereon; and
   hip simulating means mounted on said frame means including leg location simulating means horizontally adjustably mounted thereon and including extensible leg reach measuring means thereon.

2. The apparatus of claim 1 wherein said means for measuring the angle of vision comprises:
   a retractable line which can be extended to represent a particular angle of vision; and
   a compass rotatably mounted adjacent said line for measuring the angle of vision in azimuth and elevation.

3. The apparatus of claim 1 wherein said means for measuring arm reach and leg reach comprises a retractable tape measure whereby the tape measure may be extended to a hand or foot control respectively and the distance read directly from the tape.

4. The apparatus of claim 1 wherein the head simulating means includes a platform on which a camera may be mounted.

5. A device for simulating the frame of a human body in the seated position comprising:
   vertically oriented first means for simulating a human spine;
   second means mounted on and vertically positionable along said first means for simulating a head, said second means including means for measuring angles relative to the horizontally and vertically straight-ahead line of vision of the simulated seated human body;
   third means mounted on the vertically positionable along said first means for simulating the shoulders and arms of a human body, said means for simulating the arms being extensible so as to simulate all lengths of arms within the human range; and
   fourth means mounted on and vertically positionable for simulating the hips and legs of a human body in a sitting position, said means for simulating the legs being extensible so as to simulate all lengths of legs within the human range.

* * * * *